United States Patent
Figenser et al.

(10) Patent No.: US 7,478,874 B2
(45) Date of Patent: Jan. 20, 2009

(54) VEHICLE SEAT AND CABRIOLET VEHICLE WITH SUCH A VEHICLE SEAT

(75) Inventors: Hanno Figenser, Hagen (DE); Rolf-Peter Baule, Versmold (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/593,704

(22) PCT Filed: Mar. 17, 2005

(86) PCT No.: PCT/DE2005/000488

§ 371 (c)(1),
(2), (4) Date: Mar. 26, 2007

(87) PCT Pub. No.: WO2005/095152

PCT Pub. Date: Oct. 13, 2005

(65) Prior Publication Data

US 2007/0267907 A1  Nov. 22, 2007

(30) Foreign Application Priority Data

Mar. 30, 2004  (DE) .................... 10 2004 016 180

(51) Int. Cl.
*B60N 2/427* (2006.01)

(52) U.S. Cl. ............................ 297/216.13; 297/216.12; 297/408; 280/756

(58) Field of Classification Search ............ 297/216.12, 297/216.13, 408; 280/756
See application file for complete search history.

(56) References Cited

U.S. PATENT DOCUMENTS

| 5,066,040 | A | * | 11/1991 | Dangl et al. | ............... 280/756 |
| 5,205,585 | A | * | 4/1993 | Reuber et al. | ........... 280/753 X |
| 6,033,017 | A | * | 3/2000 | Elqadah et al. | ......... 297/408 X |
| 6,572,145 | B1 | * | 6/2003 | Guillez et al. | ............... 280/756 |

FOREIGN PATENT DOCUMENTS

| DE | 36 21 278 A1 | 1/1988 |
| DE | 36 21 278 C2 | 7/1989 |
| DE | 39 03 459 A1 | 8/1990 |
| EP | 0 459 213 B1 | 5/1991 |
| EP | 0 459 213 A1 | 12/1991 |
| FR | 2 814 408 A | 3/2002 |
| FR | 2 823 164 A | 10/2002 |
| WO | WO 01/10669 A | 2/2001 |

* cited by examiner

*Primary Examiner*—Anthony D Barfield
(74) *Attorney, Agent, or Firm*—Drinker, Biddle & Reath, LLP

(57) ABSTRACT

A vehicle seat, in particular functioning as a rear vehicle seat having a seat element provided at the free end of the backrest, and a vehicle with such a seat are specified in which the seat element is pivotably linked to a backrest structure of the vehicle seat and the seat element acts at the same time as a headrest and as protection against rollover.

6 Claims, 3 Drawing Sheets

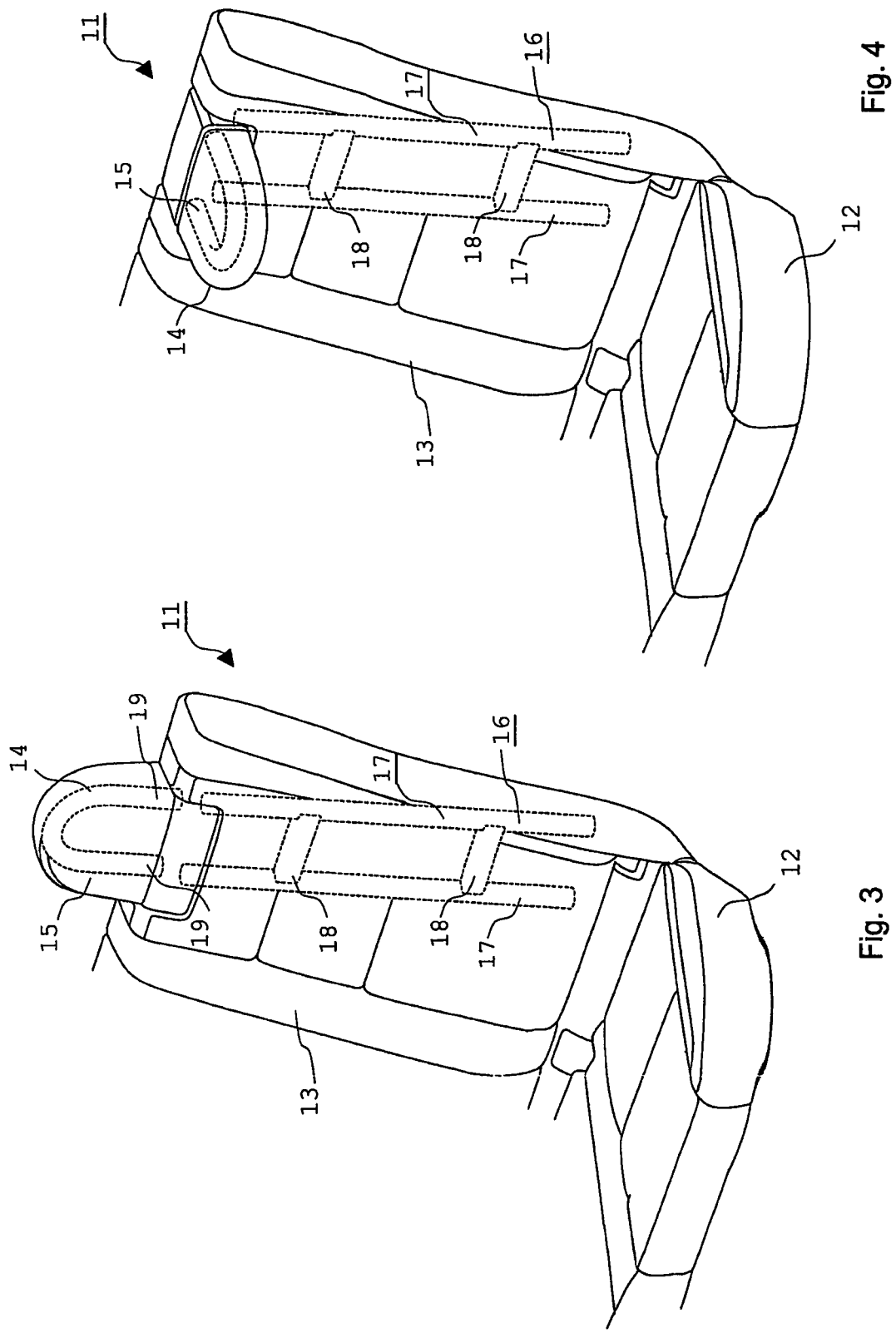

VEHICLE SEAT AND CABRIOLET VEHICLE WITH SUCH A VEHICLE SEAT

Figure 1:
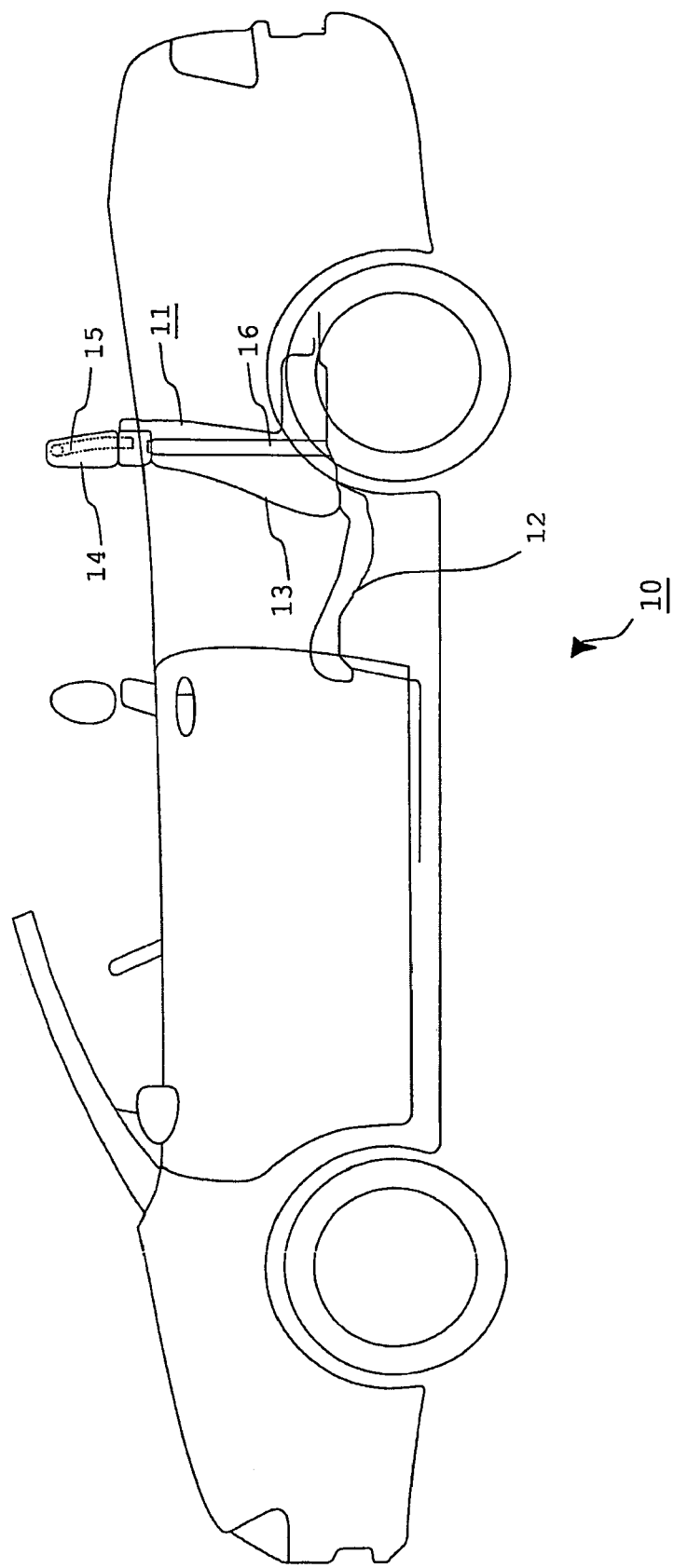

The invention relates to a vehicle seat with a backrest, in particular functioning as a rear vehicle seat, with a seat element provided at the free end of the backrest, and a cabriolet vehicle with such a vehicle seat.

Such vehicle seats and vehicles with such vehicle seats are generally known. Vehicle seats are further known in which a seat element provided at the free end of the backrest acts as a headrest.

There is known, from DE 37 32 562, a cabriolet vehicle with a roll bar which can be moved out of its rest position in the area of a rear parcel shelf behind the back seats, i.e. the rear seats, by means of a pivoting motion into its active position. A hinge bearing for such a pivoting bearing of a roll bar is known from DE 44 22 550. When the roll bar undergoes a pivoting movement which cannot be influenced by the vehicle driver due to automatic triggering in the case of corresponding exceptional circumstances, such as overturning of the vehicle, for example, it is not possible to rule out human injury in those cases where a body part, such as the head or an arm, for example, finds itself in the pivot area.

To avoid this risk of injury, DE 39 03 459 suggests a roll bar which, in its rest position, is arranged in the backrest of the seat or in a headrest connected to the backrest and which is able to be conveyed into its active position by a translative movement.

A cabriolet vehicle is known from DE 198 03 398 in which a roll bar, which is also able to be conveyed into its active position or protective position by means of a translative movement, is provided behind the headrests of the back seats as protection against rollover.

A device providing protection against rollover, which has a roll bar arranged behind the respective vehicle seat and in which a headrest pad is attached to the roll bar, is known from DE 38 22 461.

The invention consists in specifying a vehicle seat or a vehicle with such a vehicle seat, in which the function of protecting against rollover and also the function of a headrest are assumed by the same seat element and in which the seat element is designed in a foldable manner in order to improve rear viewing.

The invention is achieved with a vehicle seat, in particular functioning as a back vehicle seat (rear seat/rear seat unit), with a seat element provided at the free end of the backrest, in which the seat element is pivotably linked to a backrest structure of the vehicle seat and the seat element acts, at the same time, as a headrest and as protection against rollover.

The combination of the headrest and protection-against-rollover functionalities in one foldable seat element and its connection to the backrest structure has, to the best of the applicant's knowledge, hitherto not yet been given consideration. The invention makes possible inexpensive and efficient occupant protection. In contrast to the case of rotationally pivotable roll bars, the seat element according to the invention does not require any additional space in the area of the rear parcel shelf or the like. In contrast to the case of the translatively movable roll bar, the seat element according to the invention is always in the protection position when the vehicle seat is occupied, such that the protection function is independent of a correct and sufficiently rapid triggering, as is required with a movable roll bar. The aggregation of several functionalities in the seat element furthermore leads to simplification of manufacture. The seat element is furthermore thus also able to be simply and inexpensively produced because no complex mobility is required to achieve the protection position.

Advantageous designs of the invention form the subject-matter of the subclaims.

The seat element is particularly well suited to fulfilling its function as protection against rollover when it has a substantially U-shaped structural element. Such a longitudinally stretched U with two limbs has proven to be particularly well-suited to taking up and diverting the forces which are to be anticipated when a vehicle overturns.

The backrest structure preferably includes at least two bracing tubes which are parallel to each other, whereby each free end, i.e. each limb of the structural element, is associated with one of the bracing tubes respectively of the backrest structure such that a force diversion from the structural element to the bracing tubes of the backrest structure is possible.

For optimal diversion of force, it is further preferably provided that the backrest structure is joined to the structure side in respect of the vehicle, in particular by the backrest structure being connected to a bodyshell rear wall of the vehicle. The force is thus diverted onto structural parts of the motor vehicle, in particular onto the bodyshell rear wall.

The pivotable seat element can preferably be locked into an upright position and into a substantially horizontal position. The upright position is obviously chosen as soon as the respective seat is occupied. The horizontal position can be chosen when the respective seat is unoccupied. In the horizontal position, the blocking of the vehicle driver's rear view is rendered completely impossible, or at least impossible to the largest possible extent, by means of the folded-down seat element.

Furthermore, there arises in the side view, in the case of cabriolet vehicles, an optically pleasing line if neither a headrest nor a roll bar clearly protrudes beyond the window parapet line. This is guaranteed when the seat element is folded-down.

When the pivotable seat element is pivoted, in its substantially horizontal position, towards the vehicle interior space, the folded-down seat element does not take up any space in the area of a rear parcel shelf or soft top storage or the like. Furthermore, in the case of a "forwardly" foldable seat element, the vehicle driver can, if need be, reach the seat element from his position in the driver's seat and fold it down by means of a movement in his direction. The vehicle driver can thus react in the case of his view being impaired by an upright seat element and can also fold it down manually.

In the following, an embodiment of the invention will be described in greater detail using the drawings. Corresponding objects or elements are provided with the same reference numbers in all figures.

Figure 2:
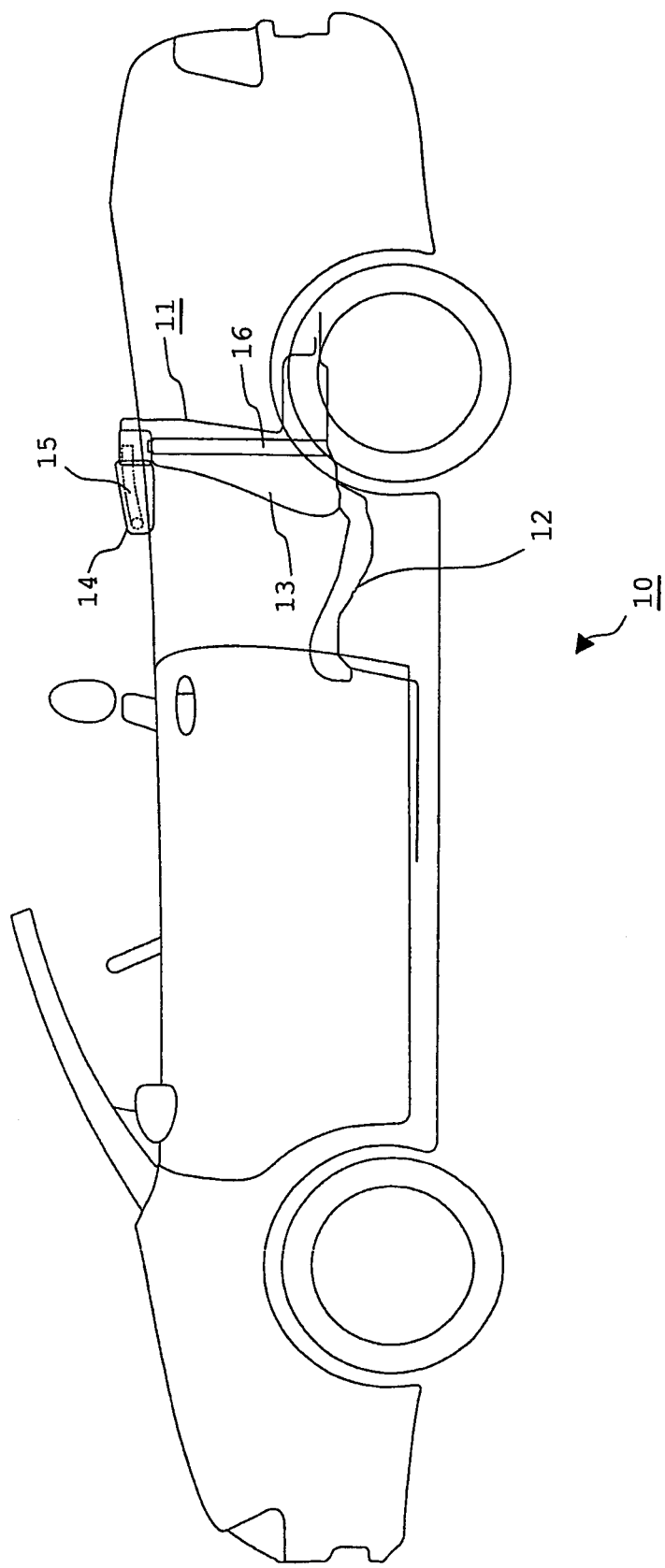

The following are shown therein:

FIG. 1 a side view of a cabriolet vehicle with an upright seat element at the rear seat, FIG. 2 a side view of a cabriolet vehicle with a folded-down seat element at the rear seat and

FIG. 3 and

FIG. 4 the rear seat as a component of a rear seat group, once with an upright seat element and once with a folded-down seat element.

FIG. 1 shows a side view of a cabriolet vehicle 10, whereby a rear region of the vehicle 10 is depicted as a phantom view. A vehicle seat 11 is shown in the rear area. This includes a seat surface 12 and a backrest 13. At the free end of the backrest 13 there is provided a seat element 14 which acts at the same time as protection against rollover and as a headrest. In the interior of the seat element 14 there is provided, with regard to its function as protection against rollover, a substantially U-shaped structural element 15. With regard to the function of the seat element 14 as a headrest, it has, in a manner known per se, padding or foaming of the structural element 15.

A backrest structural element 16 is located in the interior of the backrest. The backrest structural element 16 is also referred to in an abbreviated form as backrest structure 16. The seat element 14 is linked to the backrest structure 16. The seat element 14 is thus pivotable or foldable. Furthermore, the seat element 14 is connected to the backrest structure 16 such that, in the case of an adverse event, a diversion, onto the backrest structure 16, of the forces which are applied to the structural element 15 of the seat element 14 is guaranteed. For the further diversion of the forces, it is provided that the backrest structure 16 is connected to structural parts of the vehicle 10, for example to a bodyshell rear wall.

FIG. 2 shows substantially the same depiction as FIG. 1. In contrast to FIG. 1, the foldable seat element 14 is folded down towards the vehicle interior space. The folded-down seat element 14 barely protrudes beyond the window parapet line of the vehicle 10, so that a particularly pleasing side view of the cabriolet vehicle 10 results.

FIG. 3 and FIG. 4 show the vehicle seat 11 as a rear seat and as a component of a rear seat group, once with an upright seat element and once with a folded-down seat element 14.

In FIG. 3, the vehicle seat with the upright seat element 14 is shown. The backrest 13 is depicted as a phantom view such that the backrest structural element 16 is visible. The backrest structural element 16 includes two parallel bracing tubes 17 which are connected to each other by cross struts 18. The structural element 15 in the form of an inverted "U" has a limb 19 at each of its free ends. The backrest structure 16 and the structural element 15 are oriented in respect of each other, such that the limbs 19 are situated on the same line or at least on substantially the same line as the bracing tubes 17 of the backrest structure 16. In this manner, an optimal diversion of any force applied to the structural element 15 into the backrest structure 16 is possible. For the further diversion of the force, the backrest structure 16 is connected, in a non-depicted manner, to bearing elements of the vehicle, for example a bodyshell rear wall.

FIG. 4 shows substantially the same depiction as FIG. 3. In contrast to FIG. 3, the foldable seat element 14 is folded down towards the vehicle interior space. In order to bring about the foldability of the seat element 14, the seat element 14 is linked to the backrest structure in a manner which is not depicted in greater detail. The linking includes, for example, an axle around which the folding or pivoting movement occurs, and means, not depicted in greater detail, for locking the seat element 14 at least in the upright and/or in the folded-down position. Furthermore, means (also not depicted), for example a spring or the like, can be provided to move the seat element 14 into the upright or the folded-down position when the locking is released.

LIST OF REFERENCE NUMBERS

10 Cabriolet vehicle
11 Vehicle seat
12 Seat surface
13 Backrest
14 Seat element
15 Structural element
16 Backrest structure, backrest structural element
17 Bracing tube
18 Cross strut
19 Limb

The invention claimed is:

1. A vehicle seat having a backrest and a seat element provided at the free end of the backrest, characterised in that the seat element is pivotably linked to a backrest structure of the vehicle seat, the seat element being pivotable relative to the backrest structure about a pivoting axis that is substantially orthogonal to a longitudinal axis of the vehicle, wherein the seat element acts, at the same time, as a headrest and as protection against rollover, whereby the seat element has a substantially U-shaped structural element, and whereby the backrest structure includes at least two bracing tubes which are parallel to each other and whereby each free end of the structural element is respectively attached to one of the bracing tubes of the backrest structure such that a force diversion from the structural element to the bracing tube of the backrest structure is possible.

2. The vehicle seat according to claim 1, whereby the backrest structure is joined to the structure side in respect of the vehicle by the backrest structure being connected to a bodyshell rear wall of the vehicle.

3. The vehicle seat according to claim 2, whereby the pivotable seat element can be locked in an upright position and in a substantially horizontal position.

4. The vehicle seat according to claim 3, whereby the pivotable seat element is pivoted, in its substantially horizontal position, towards the vehicle interior space.

5. A vehicle seat having a backrest and a seat element provided at the free end of the backrest, characterised in that the seat element is pivotably linked to a backrest structure of the vehicle seat and the seat element acts, at the same time, as a headrest and as protection against rollover;

whereby the seat element has a substantially U-shaped structural element;

whereby the backrest structure includes at least two bracing tubes which are parallel to each other and whereby each free end of the structural element is respectively attached to one of the bracing tubes of the backrest structure such that a force diversion from the structural element to the bracing tube of the backrest structure is possible;

whereby the backrest structure is joined to the structure side in respect of the vehicle; and whereby the pivotable seat element can be locked in an upright position and in a substantially horizontal position.

6. The vehicle seat according to claim 5, whereby the pivotable seat element is pivoted, in its substantially horizontal position, towards the vehicle interior space.

* * * * *